US011303127B2

(12) United States Patent
Santi et al.

(10) Patent No.: US 11,303,127 B2
(45) Date of Patent: Apr. 12, 2022

(54) METHOD FOR INTELLIGENT LOAD MANAGEMENT IN OFF-GRID AC SYSTEMS

(71) Applicant: University of South Carolina, Columbia, SC (US)

(72) Inventors: Enrico Santi, Columbia, SC (US); Andrew Wunderlich, Columbia, SC (US)

(73) Assignee: University of South Carolina, Columbia, SC (US)

( * ) Notice: Subject to any disclaimer, the term of this patent is extended or adjusted under 35 U.S.C. 154(b) by 62 days.

(21) Appl. No.: 16/832,055

(22) Filed: Mar. 27, 2020

(65) Prior Publication Data

US 2020/0313437 A1 Oct. 1, 2020

Related U.S. Application Data

(60) Provisional application No. 62/826,096, filed on Mar. 29, 2019.

(51) Int. Cl.
*H02J 13/00* (2006.01)
*H02J 3/32* (2006.01)
*H02J 7/00* (2006.01)

(52) U.S. Cl.
CPC .............. *H02J 3/32* (2013.01); *H02J 7/0068* (2013.01); *H02J 13/00006* (2020.01)

(58) Field of Classification Search
CPC ....... H02J 3/32; H02J 13/00006; H02J 7/0068
See application file for complete search history.

(56) References Cited

U.S. PATENT DOCUMENTS

| | | | | |
|---|---|---|---|---|
| 7,148,650 | B1 * | 12/2006 | McNulty | H02P 23/0077 318/801 |
| 8,638,011 | B2 * | 1/2014 | Robinson | G06F 1/3287 307/115 |
| 10,892,618 | B1 * | 1/2021 | Cooper | H02J 3/14 |
| 10,951,036 | B2 * | 3/2021 | Donahue | H02J 13/00006 |
| 2016/0013646 | A1 * | 1/2016 | Akerson | H02J 3/14 307/39 |

* cited by examiner

*Primary Examiner* — Dinh T Le
(74) *Attorney, Agent, or Firm* — Burr & Forman LLP; Douglas L. Lineber

(57) ABSTRACT

The current disclosure provides methods and systems for intelligent load management in off-grid AC systems and provides methods and systems to control and prioritize loads, so that supply and demand can be balanced via an extremely robust and reliable system.

19 Claims, 6 Drawing Sheets

Table 1
Battery Current Set Point Over AC Frequency Range

| $f_{min}$ [Hz] | $f_{max}$ [Hz] | $I_{batt}$ [A$_{RMS}$] |
|---|---|---|
| 58 | 58.5 | -40 (discharging) |
| 58.5 | 59.5 | -20 (discharging) |
| 59.5 | 60.5 | 0 |
| 60.5 | 61.5 | 20 (charging) |
| 61.5 | 62 | 40 (charging) |

FIGURE 4

METHOD FOR INTELLIGENT LOAD MANAGEMENT IN OFF-GRID AC SYSTEMS

BACKGROUND OF THE INVENTION

1) Field of the Invention

The current disclosure provides methods for intelligent load management in off-grid AC systems and provides methods to control and prioritize loads, so that supply and demand can be balanced via an extremely robust and reliable system.

2) Description of Related Art

In an off-grid application typically available power is limited and the total load power exceeds the maximum power generation capability. Therefore, it becomes important to manage and prioritize loads based on current system status. This is similar to demand response in grid systems. Additionally, if energy storage is available, the battery state of charge must be managed: the battery should act as a power source when power demand is high and recharge when extra power is available.

In a grid-connected application the frequency of the AC voltage is tightly controlled by the power utility and any local inverter—for example a solar inverter—has to be phase-synchronized to the grid. However, in an off-grid application there is no such constraint: the local inverter establishes the AC voltage and determines its frequency.

Accordingly, it is an object of the present invention to change the AC voltage frequency to provide a channel of communication between the inverter and the rest of the system that can be used for load management. The converter varies the AC frequency as a function of available power generation capacity, making that information instantaneously available throughout the system and intelligent loads adjust their operation based on this signal. In particular, loads can be prioritized and system overloading can be avoided. This increases system robustness and ensures that more important loads are preferentially served.

SUMMARY OF THE INVENTION

The above objectives are accomplished according to the present disclosure by providing in a first embodiment an off-grid power system. The system may include at least one local power generator, at least one battery, at least one variable frequency inverter for establishing AC voltage and determining AC frequency, a channel of communication formed via changing the AC voltage, at least one converter that varies AC frequency as a function of available power generation capacity, wherein the varying AC frequency comprises information that is available throughout the system, and at least one energy load, wherein the at least one energy load is adjusted in response to the varying AC frequency to prioritize the at least one energy load to avoid system overloading, wherein the off-grid system does not include a separate communication channel. Further, an inverter frequency may be controlled in the range of $f_{min}<f_{nom}<f_{max}$, wherein $f_{min}$ is the minimum frequency, $f_{nom}$ is the nominal frequency and $f_{max}$ is the maximum frequency. Still yet, a lower frequency indicates less power is available and total load is reduced. Further still, a higher frequency indicates that extra power is available for the off-grid system. Still again, the system may include trip points for load disconnect. Further again, the load disconnect may activate when the AC frequency falls below a preset value to prioritize at least one load. Still yet, the system may include at least two loads wherein the at least two loads are listed in order of decreasing priority, wherein the lowest priority load will be shut off when the AC frequency falls below a preset value. Further, the battery is in a charge mode when the AC frequency is above a preset value and the battery supplies power to the at least one load when the AC frequency is below the preset value. Still yet, the preset value may comprise a frequency range with a high frequency and a low frequency point defined to condition battery operation.

In a further embodiment, a method is provided for managing and prioritizing loads based on system status. The method may include establishing AC voltage and determining AC frequency via a local inverter, creating a channel of communication via changing AC voltage frequency, varying AC frequency, via a converter, as a function of available power generation capacity, wherein the varying AC frequency comprises information that is available throughout the system, and adjusting at least one intelligent load based on the varying AC frequency to prioritize the intelligent load and avoid system overloading, wherein the AC frequency controls source power in steps from a negative value when frequency is low to full power delivered to the at least one intelligent load when signaling frequency is high. Further, the method may not employ a separate communication channel but instead the AC frequency signal communicates to an entirety of the system. Still yet, the method may comprise controlling an inverter frequency in the range of $f_{min}<f_{nom}<f_{max}$, wherein $f_{min}$ is the minimum frequency, $f_{nom}$ is the nominal frequency and $f_{max}$ is the maximum frequency. Again, the method may include reducing total load when a lower frequency indicates less power is available. Further again, the method may include a higher frequency indicating that extra power is available for the system. Still yet, the method employ trip points for load disconnect. Again, the method may include activating the load disconnect when the AC frequency falls below a preset value to prioritize at least one load. Yet further, the method may include listing at least two loads in order of decreasing priority and shutting off a lowest priority load when the AC frequency falls below a preset value. Still further, the method may include placing a battery in a charge mode when the AC frequency is above a preset value and supplying power from the battery to the at least one intelligent load when the AC frequency is below the preset value. Further yet, the method may include the preset value comprising a frequency range with a high frequency and a low frequency point defined to condition battery operation.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4 shows Table 1, which shows values and frequencies for battery control.

Figure 1:
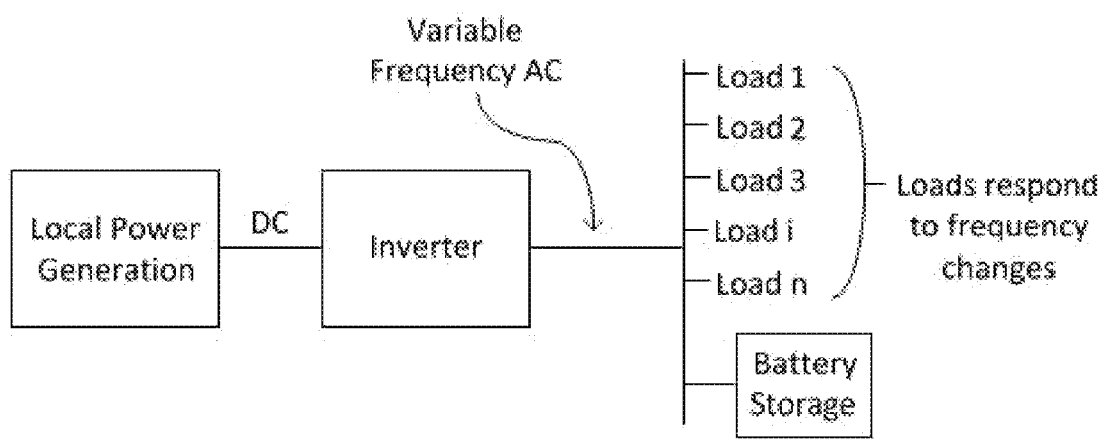
FIG. 1 shows an off-grid AC system.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

This disclosure applies to an off-grid system, such as an off-grid house, building or industrial factory. In an off-grid application typically available power is limited and the total load power exceeds the maximum power generation capability. Therefore, it becomes important to manage and prioritize loads based on current system status. This is similar to demand response in grid systems. Additionally, if energy storage is available, the battery state of charge must be managed: the battery should act as a power source when power demand is high and recharge when extra power is available.

In a grid-connected application the frequency of the AC voltage is tightly controlled by the power utility and any local inverter—for example a solar inverter—has to be phase-synchronized to the grid. However, in an off-grid application there is no such constraint: the local inverter establishes the AC voltage and determines its frequency. Changing the AC voltage frequency provides a channel of communication between the inverter and the rest of the system that can be used for load management. According to the invention, the converter varies the AC frequency as a function of available power generation capacity, making that information instantaneously available throughout the system. Intelligent loads adjust their operation based on this signal. In particular, loads can be prioritized and system overloading can be avoided. This increases system robustness and ensures that more important loads are preferentially served.

Changing the AC voltage frequency provides a channel of communication between the inverter and the rest of the system that can be used for load management. According to the invention, the converter varies the AC frequency as a function of available power generation capacity, making that information instantaneously available throughout the system. Intelligent loads adjust their operation based on this signal. In particular loads can be prioritized and system overloading can be avoided. This increases system robustness and ensures that more important loads are preferentially served.

In a preferred embodiment of this invention, the inverter frequency is controlled in the range:

$$f_{min} < f_{nom} < f_{max}$$

where $f_{min}$ is the minimum frequency, $f_{nom}$ is the nominal frequency and $f_{max}$ is the maximum frequency. A lower frequency indicates that less power is available and total load should be reduced. A higher frequency indicates that extra power is available. The off-grid system of FIG. 1 includes local power generation, a variable-frequency inverter powering intelligent loads and, optionally, a battery energy storage system. The AC frequency of the inverter is varied to indicate available generation power. Loads can sense the AC frequency and react accordingly. A simple scheme has trip points, as known to those of skill in the art, for load disconnect when the frequency goes below a certain value. This provides a mechanism to prioritize loads. This is shown in FIG. 2. Loads 1 to n are listed in order of decreasing priority, so that Load n will be the first to turn off as AC frequency goes down. On the other hand, Load 1 will be on up to a lower AC frequency. The battery storage is in charge mode when the frequency is high and extra power is available, it is off in an intermediate range and operates in discharge mode providing power to loads when the AC frequency is low, indicating that less generation power is available.

The AC frequency of the inverter is varied to indicate available generation power. Loads can sense the AC frequency and react accordingly. A simple scheme has trip points for load disconnect when the frequency goes below a certain value, such as a present AC frequency value. This provides a mechanism to prioritize loads. This is shown in FIG. 2. Loads 1 to n are listed in order of decreasing priority, so that Load n will be the first to turn off as AC frequency goes down. On the other hand, Load 1 will be on up to an even lower AC frequency. The battery storage is in charge mode when the frequency is high, i.e., above a preset AC frequency, and extra power is available, it is off in an intermediate range, such as a preset range of frequencies with a first and second present range points that determine/condition battery operation, and operates in discharge mode providing power to loads when the AC frequency is low, i.e., below a set frequency, indicating that less generation power is available.

More complex schemes may be devised. Trip points may change based on other constraints (e.g., the HVAC trip point may change if the house temperature becomes uncomfortable, making it a higher priority load). Certain variable loads may be varied continuously as a function of frequency. Different frequency ranges may be used to command different system operating modes.

It is known that the grid utilizes frequency control as one of the ancillary services required for reliable grid operation. However, the current disclosure applies to a completely different type of systems: off-grid AC systems.

Advantages of the proposed method include: (1) the method provides real-time intelligent management of loads, improving system functionality and performance; (2) allows flexible prioritization of loads; (3) does not require a separate communication channel, which may fail; (4) is robust and has high reliability—if AC power is available, the information is automatically provided to the entire system.

This disclosure applies to an off-grid system, such as an off-grid house, building or industrial factory. In an off-grid application typically available power is limited and the total load power exceeds the maximum power generation capability. Therefore, it becomes important to manage and prioritize loads based on current system status. This is similar to demand response in grid systems. Additionally, if energy storage is available, the battery state of charge must be managed: the battery should act as a power source when power demand is high and recharge when extra power is available.

In a grid-connected applications, the frequency of the AC voltage is tightly controlled by the power utility and any local inverter—for example a solar inverter—has to be phase-synchronized to the grid. However, in an off-grid application there is no such constraint: the local inverter establishes the AC voltage and determines its frequency. Changing the AC voltage frequency provides a channel of communication between the inverter and the rest of the system that can be used for load management. According to the invention, the converter varies the AC frequency as a function of available power generation capacity, making that information instantaneously available throughout the system. Intelligent loads adjust their operation based on this signal. In particular loads can be prioritized and system overloading can be avoided. This increases system robustness and ensures that more important loads are preferentially served.

More complex schemes could be devised. Trip points may change based on other constraints (the HVAC trip point may change if the house temperature becomes uncomfortable, making it a higher priority load). Certain variable loads may be varied continuously as a function of frequency. Different frequency ranges may be used to command different system operating modes.

It is well known that the grid utilizes frequency control as one of the ancillary services required for reliable grid operation. Note that the present invention applies to a completely different type of systems: off-grid AC systems.

Advantages of the proposed method are: (1) the method provides real-time intelligent management of loads, improving system functionality and performance; (2) the method allows flexible prioritization of loads; and (3) the method does not require a separate communication channel, which may fail; and (4) the method is robust and has high reliability—if AC power is available, the information is automatically provided to the entire system.

Figure 2:
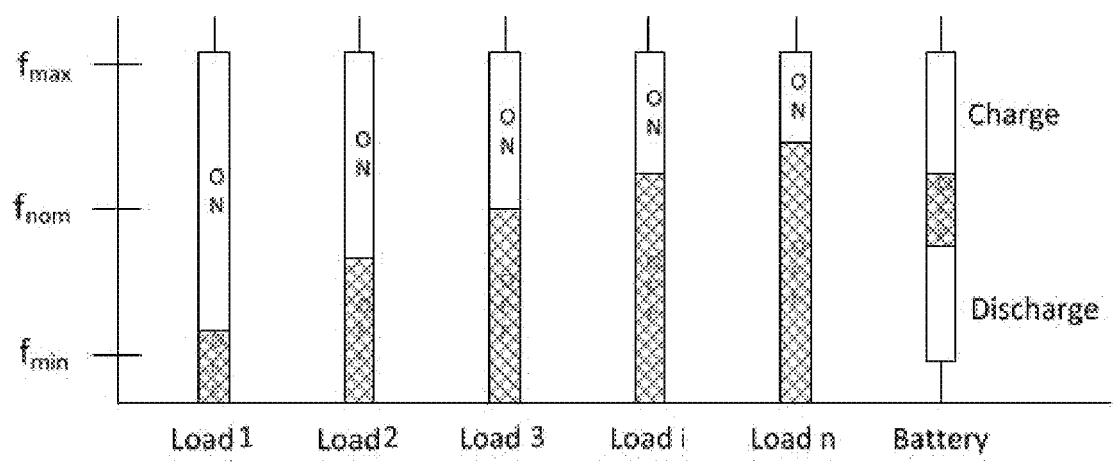
FIG. 2 shows a load management strategy based on operating frequency of the current disclosure.
Figure 3:
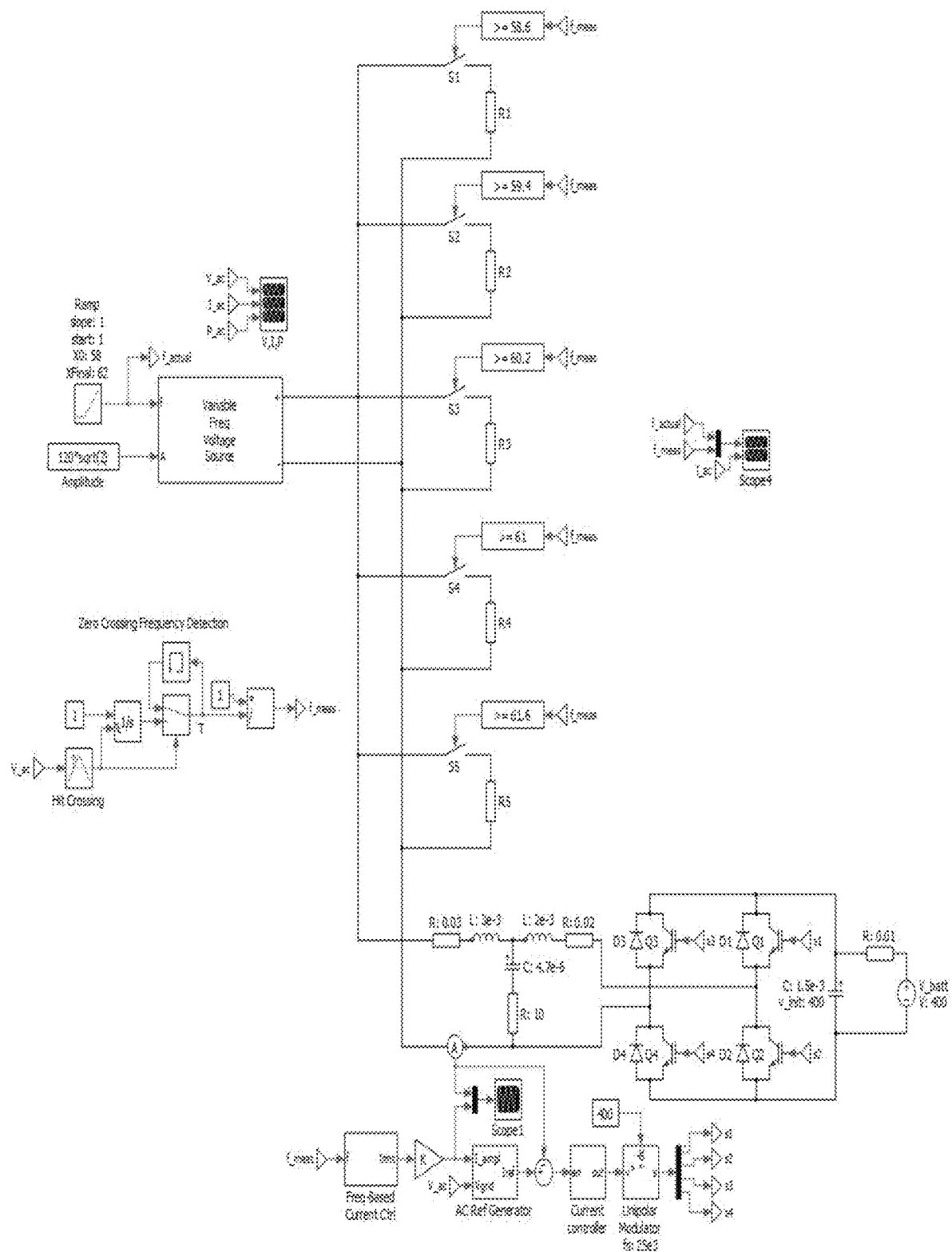
FIG. 3 shows a simulated system featuring a variable frequency AC voltage source, five loads with a controllable disconnect, and a battery interfaced through a current-controlled AC/DC converter.

For validation and proof of concept the system of FIG. 1 was simulated in PLECS (Piecewise Linear Electrical Circuit Simulation) using the simple load management strategy depicted in FIG. 2. The schematic of the simulated system is shown in FIG. 3.

The system operated at a nominal frequency of 60 Hz, with variation allowed in the range $58<f<62$ according to the limits prescribed in (1). To demonstrate the concept, the AC frequency was slowly ramped through the full range of frequencies, starting at 58 Hz and ending at 62 Hz. In response to the changing frequency, several loads toggle from off to on, and the battery transitions from discharging to charging.

As shown in FIG. 2, each of the five loads simply connects or disconnects at a frequency threshold, with lower thresholds for higher priority loads. The battery is controlled with a frequency-modulated scheme which takes on five discrete levels. The values and corresponding frequencies are shown in Table I, see FIG. 4.

Figure 5:
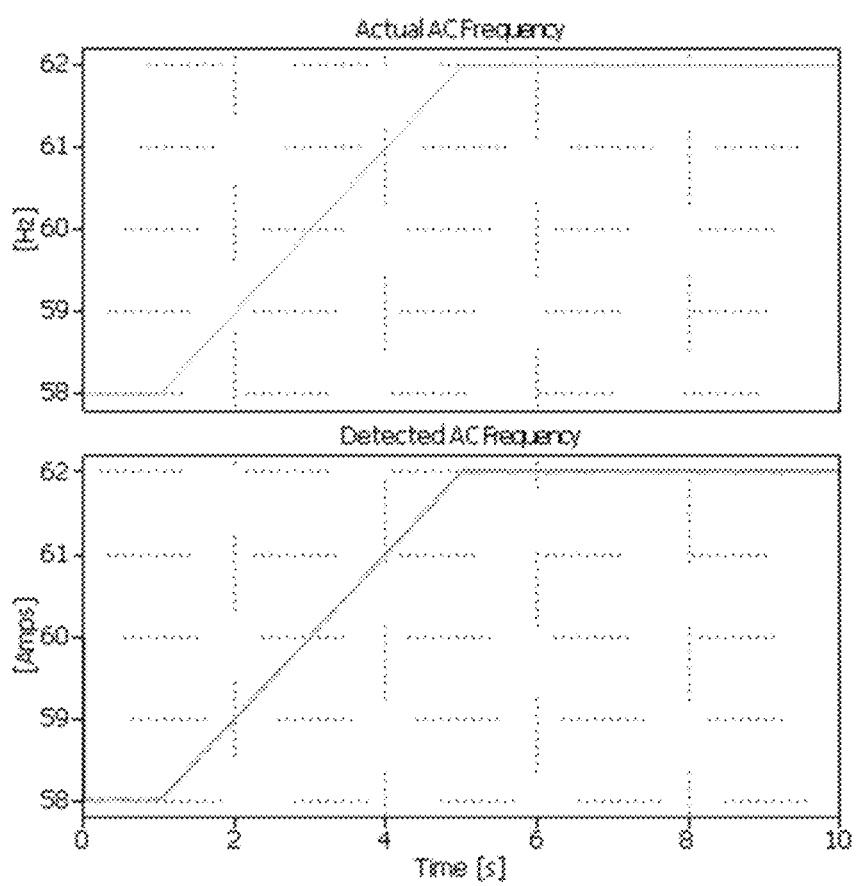
FIG. 5 shows the zero-crossing frequency detection algorithm output matches the actual AC frequency throughout the entire simulation.

A frequency crossing detection algorithm based on detection of zero crossings in the AC waveform is utilized as an example of how loads might sense and respond to the AC frequency. The real AC frequency and output of the detection algorithm are shown to match extremely well in FIG. 5.

Figure 6:
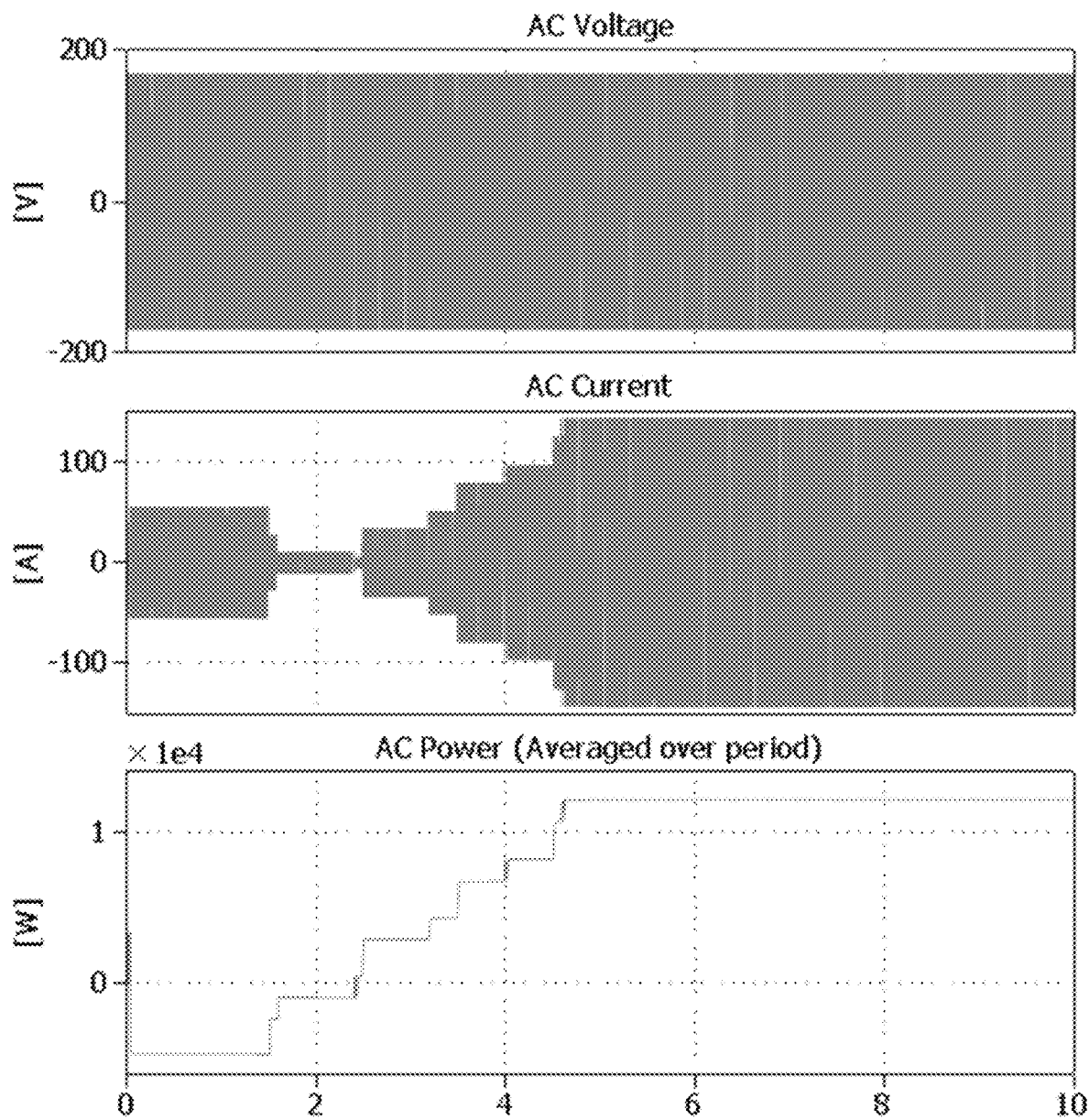
FIG. 6 the voltage, current, and power from the AC source.

As it ramps up, the frequency crosses turn-on thresholds for each of the 5 loads, and it crosses the boundaries for the set-point current of the battery as given in Table 1, see FIG. 4. These threshold changes are observed in the current demanded from the AC supply, resulting in stepped changes in power. FIG. 6 shows the AC voltage, AC current and AC power supplied by the AC source. The AC voltage amplitude is always 120 Vrms so that the AC voltage envelope is a constant band. When the command frequency is low, all loads are off and the battery provides power back to the AC source and AC power is negative. As the signaling frequency increases, loads switch on at their threshold point and battery current changes polarity as in Table I, see FIG. 4. The net result is that the frequency signal controls the source power in steps from a negative value when frequency is low to full power delivered to the loads when signaling frequency is high. This is the desired behavior with power consumption being controlled by the signaling frequency.

All patents, patent applications, published applications, and publications, databases, websites and other published materials referred to throughout the entire disclosure herein, unless noted otherwise, are incorporated herein by reference in their entirety.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An off-grid system comprising:
   at least one local power generator;
   at least one battery in communication with the power generator;
   at least one variable frequency inverter in communication with the at least one local power generator and at least one battery, having an AC voltage and an AC frequency;
   a channel of communication formed within the off-grid system via changing the AC voltage of the inverter;
   at least one converter, in communication with the at least one power generator, at least one battery, and at least one variable frequency inverter, that varies the AC frequency of the inverter, via changing an AC voltage frequency as a function of available power generation capacity, wherein varying the AC frequency of the inverter comprises information that is available throughout the system;
   at least one energy load, wherein the at least one energy load is adjusted in response to varying the AC frequency of the inverter to prioritize the at least one energy load to avoid system overloading, via turning off the at least one load when varying the AC frequency of the inverter reaches a predetermined AC frequency; and
   wherein the off-grid system does not include a separate communication channel.

2. The off-grid system of claim 1, wherein the inverter AC frequency is controlled in a range of $f_{min} < f_{nom} < f_{max}$, wherein $f_{min}$ is a minimum frequency, $f_{nom}$ is a nominal frequency and $f_{max}$ is a maximum frequency.

3. The off-grid system of claim 1, wherein a lower inverter AC frequency indicates less power is available and total load is reduced.

4. The off-grid system of claim 1, wherein a higher inverter AC frequency indicates that extra power is available for the off-grid system.

5. The off-grid system of claim 1, further comprising at least one predetermined AC frequency trip points to determine when to cause a load disconnect.

6. The off-grid system of claim 5, wherein the load disconnect occurs when the AC frequency falls below a preset value to prioritize at least one load.

7. The off-grid system of claim 1, comprising at least two loads wherein the at least two loads are listed in order of decreasing priority, wherein a lowest priority load will be shut off when the AC frequency falls below a preset value.

8. The off-grid system of claim 1, wherein the at least one battery is in a charge mode when the AC frequency is above a preset value and the at least one battery supplies power to the at least one load when the AC frequency is below the preset value.

9. The off-grid system of claim 8, wherein the preset value comprises a frequency range with a high frequency and a low frequency point defined to condition battery operation.

10. A method for managing and prioritizing loads based on system status comprising:
    establishing AC voltage and determining AC frequency via at least one local inverter;
    creating a channel of communication between the at least one local inverter, at least one converter, and at least one intelligent load via changing AC voltage frequency;
    varying AC frequency of the inverter, via the converter changing an AC voltage frequency, as a function of available power generation capacity, wherein the varying AC frequency of the inverter comprises information that is available throughout the system; and
    adjusting the at least one intelligent load based on the varying AC frequency to prioritize the intelligent load and avoid system overloading, via turning off the at least one load when the varying AC frequency of the inverter reaches a predetermined AC frequency, wherein the AC frequency of the inverter controls source power in steps from a negative value when frequency is low to full power delivered to the at least one intelligent load when signaling frequency is high.

11. The method of claim 10, wherein the method does not employ a separate communication channel but instead the AC frequency of the inverter communicates to an entirety of the system.

12. The method of claim 10, further comprising controlling an inverter frequency in a range of $f_{min} < f_{nom} < f_{max}$, wherein $f_{min}$ is a minimum frequency, $f_{nom}$ is a nominal frequency and $f_{max}$ is a maximum frequency.

13. The method of claim 10, further comprising reducing total load when a lower AC frequency of the inverter indicates less power is available.

14. The method of claim 10, further comprising a higher AC frequency of the inverter indicating that extra power is available for the system.

15. The method of claim 10, further comprising employing at least one predetermined AC frequency trip point to determine when to cause a load disconnect.

16. The method of claim 15, further comprising causing the load disconnect when the AC frequency of the inverter falls below a preset value to prioritize at least one load.

17. The method of claim 10, further comprising listing at least two loads in order of decreasing priority and shutting off a lowest priority load when the AC frequency of the inverter falls below a preset value.

18. The method of claim 10, further comprising placing at least one battery in a charge mode when the AC frequency is above a preset value and supplying power from the at least one battery to the at least one intelligent load when the AC frequency of the inverter is below the preset value.

19. The method of claim 18, further comprising the preset value comprising a frequency range with a high frequency and a low frequency point defined to condition battery operation.

* * * * *